Dec. 16, 1958  R. O. BRADLEY ET AL  2,864,606
HANGER SHAFT FOR UNIT WEIGHTS
Filed April 13, 1954  6 Sheets-Sheet 1
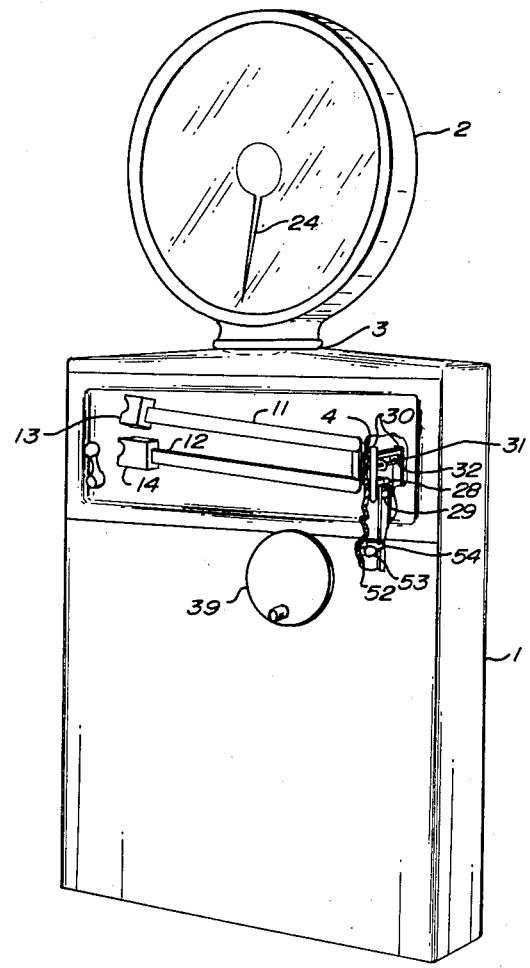
Fig. I
INVENTORS
ROBERT O. BRADLEY
CLAYTON H. MAURICE JR.
BY
Marshall, Marshall & Yeasting
ATTORNEYS Dec. 16, 1958     R. O. BRADLEY ET AL     2,864,606
HANGER SHAFT FOR UNIT WEIGHTS
Filed April 13, 1954     6 Sheets-Sheet 2
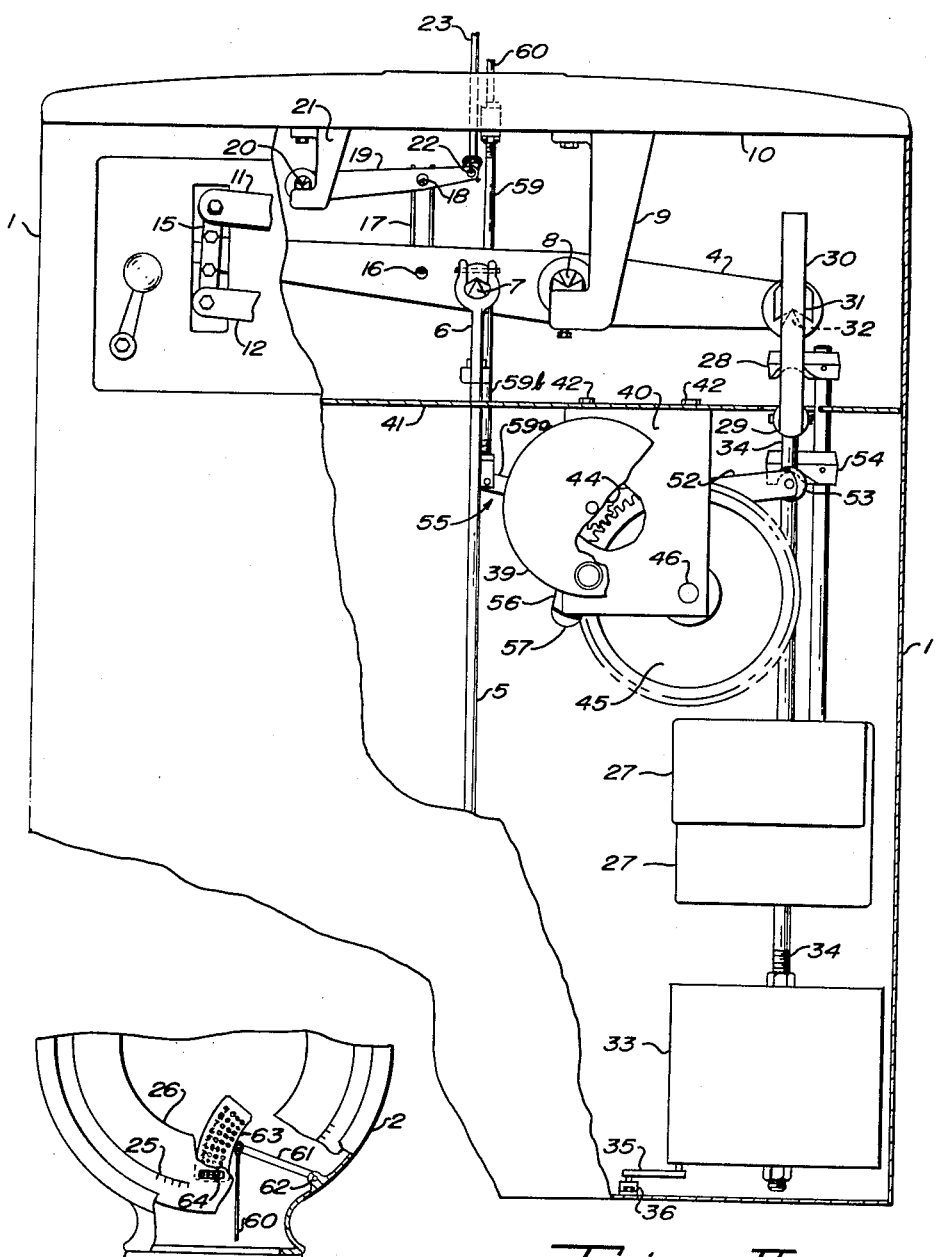
Fig. II
Fig. III
INVENTORS
ROBERT O. BRADLEY
CLAYTON H. MAURICE JR
BY
Marshall, Marshall & Yeasting
ATTORNEYS Dec. 16, 1958   R. O. BRADLEY ET AL   2,864,606
HANGER SHAFT FOR UNIT WEIGHTS
Filed April 13, 1954   6 Sheets-Sheet 3
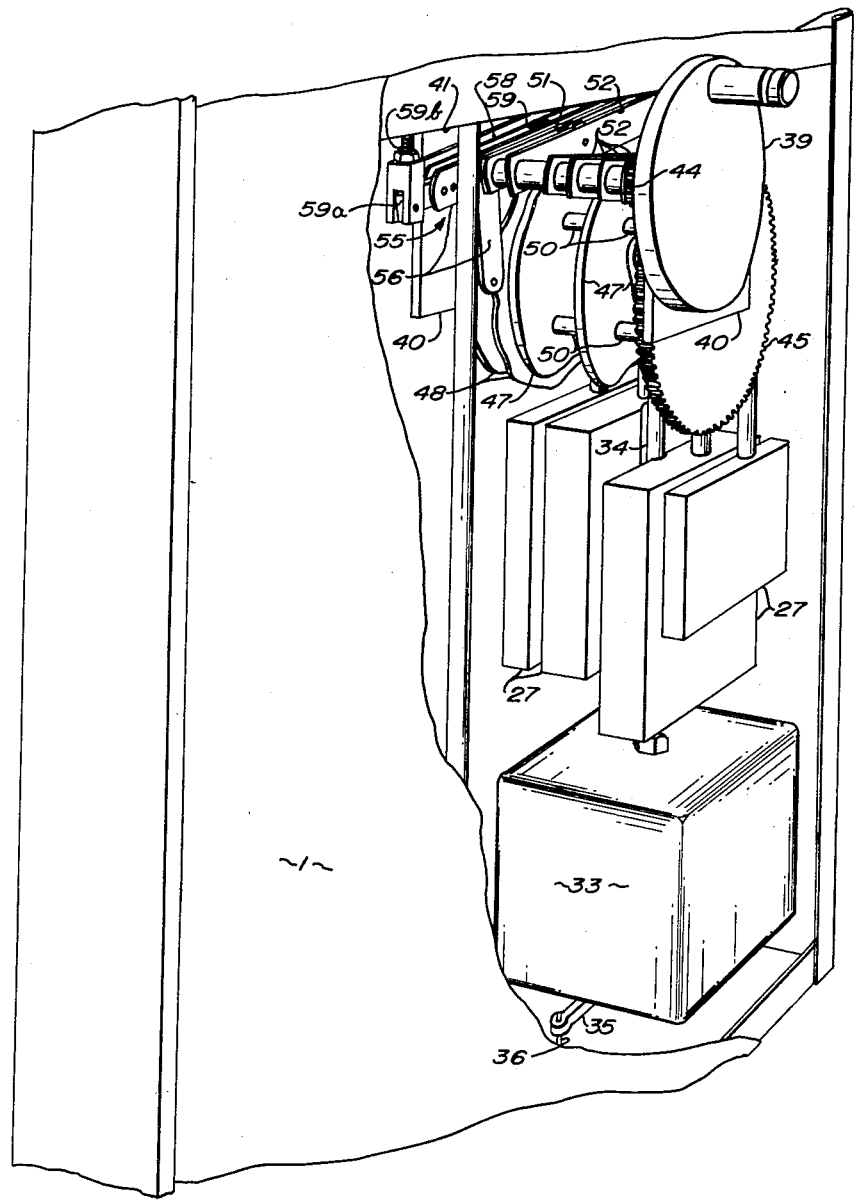
Fig. IV
INVENTORS
ROBERT O. BRADLEY
CLAYTON H. MAURICE JR.
BY
Marshall, Marshall & Yeasting
ATTORNEYS

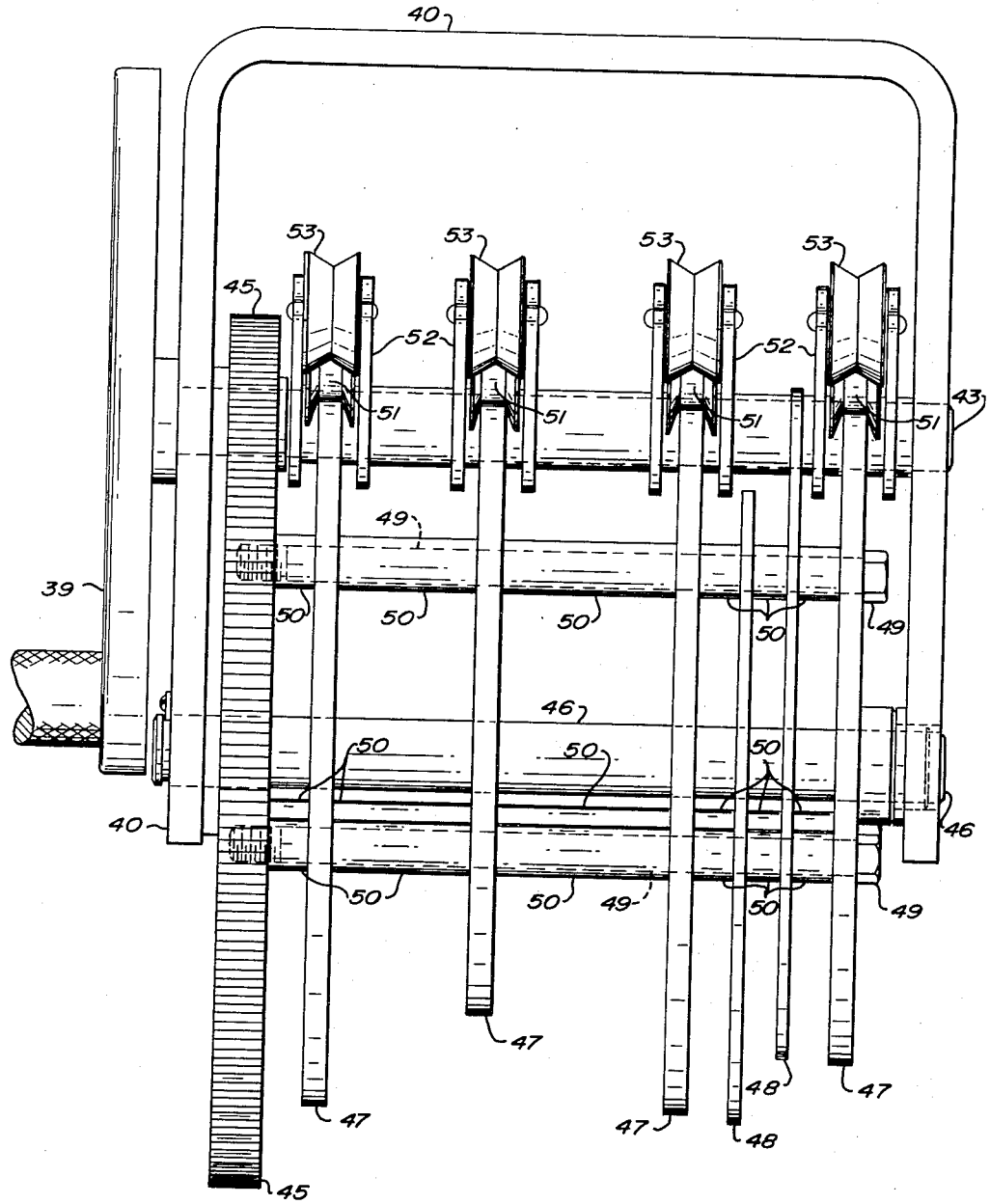

Dec. 16, 1958   R. O. BRADLEY ET AL   2,864,606
HANGER SHAFT FOR UNIT WEIGHTS
Filed April 13, 1954   6 Sheets-Sheet 5
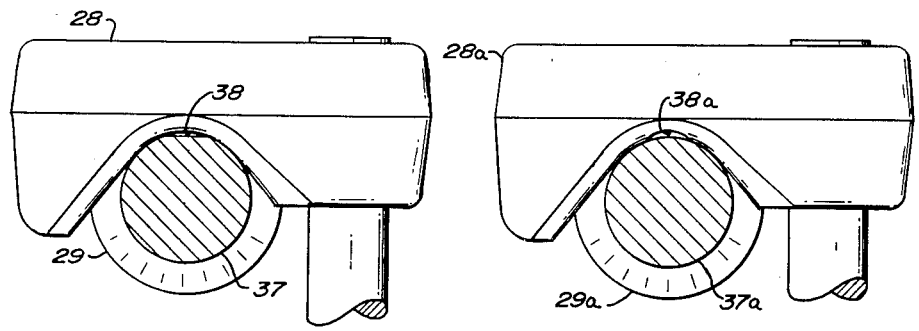
Fig. VII   Fig. VIII
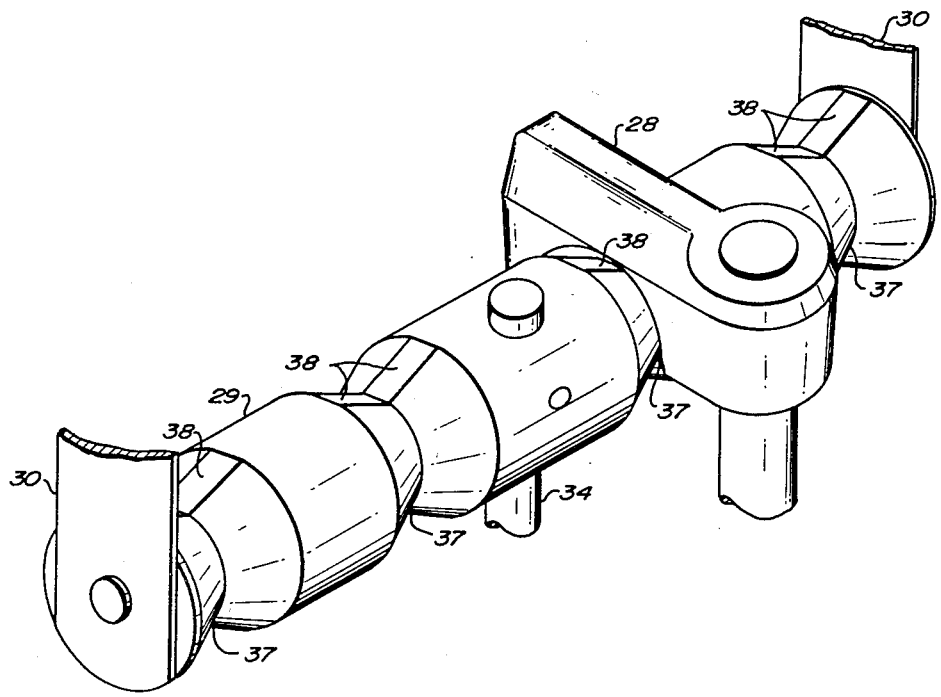
Fig. VI
INVENTORS
ROBERT O. BRADLEY
CLAYTON H. MAURICE JR.
BY
Marshall, Marshall & Yeasting
ATTORNEYS Dec. 16, 1958   R. O. BRADLEY ET AL   2,864,606
HANGER SHAFT FOR UNIT WEIGHTS
Filed April 13, 1954   6 Sheets-Sheet 6
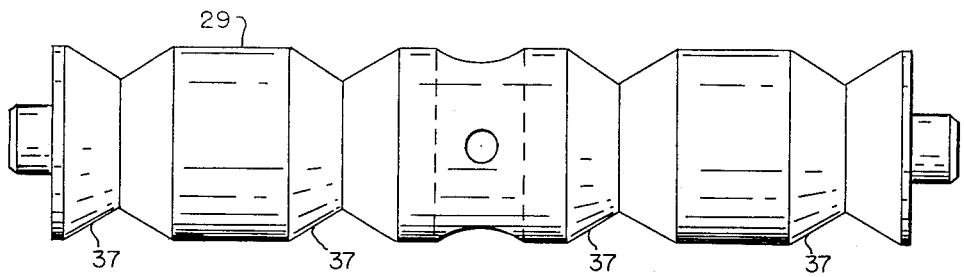
*Fig. IX*
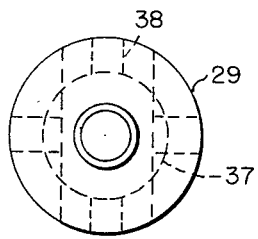
*Fig. X*
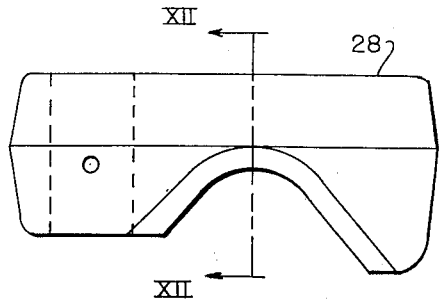
*Fig. XI*
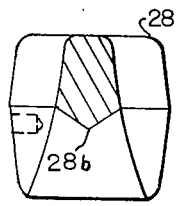
*Fig. XII*
INVENTORS.
ROBERT O. BRADLEY
CLAYTON H. MAURICE JR.
BY
Marshall, Marshall & Yeasting
ATTORNEYS

United States Patent Office 2,864,606
Patented Dec. 16, 1958

2,864,606

HANGER SHAFT FOR UNIT WEIGHTS

Robert O. Bradley and Clayton H. Maurice, Jr., assignors, by mesne assignments, to Toledo Scale Corporation, Toledo, Ohio, a corporation of Ohio Application April 13, 1954, Serial No. 422,832

5 Claims. (Cl. 265—60)

This invention relates generally to weighing scales, and more particularly to scales which are provided with manually applied "unit weights" for increasing the load offsetting capacity.

Many weighing scales are constructed which incorporate additional so-called "unit weights" for increasing the load counterbalancing capacity of the scale without decreasing the sensitivity of indication given by the main scale indicator. This is usually accomplished by means of manually operable weights which are placed on the weighing scale mechanism, one at a time, and each of which increases the capacity of the scale by some fixed amount, e. g. 500 or 1000 pounds. In scales so equipped, the unit weights may counterbalance as much as four-fifths or more of the total weighing capacity of the scale, the remaining one-fifth being counterbalanced by automatic load counterbalancing mechanism and indicated by the regular scale indicator attached thereto. The indication of the increased weighing capacity of the scale, that achieved by the unit weights, is usually in the form of small flags which state the amount to be added to the indication to give the total weight of the load on the scale.

In weighing scales having a manipulative unit weight system it has been customary to make the counterbalancing capacity of each unit weight exactly the same as the capacity of the automatic load counterbalancing means. Unit weight lifting mechanism is operated to place one or more unit weights into cooperative relation with the automatic load counterbalancing mechanism when a load is on the platform which exceeds the automatic counterbalancing capacity as indicated by the chart. Heretofore, when this was done, the unit weights which are hooked on a hanger bar supported from the lever system of the scale would swing back and forth for a comparatively long time and cause the scale indicator to oscillate.

The principal object of this invention is to provide a manipulative unit weight system adapted to greatly reduce the period of swing on the unit weights when the unit weight lifting mechanism is operated.

More specific objects and advantages are apparent from the following description of a specific embodiment of the invention.

According to the invention, a weighing scale having an automatic load counterbalancing system is provided with a manipulative unit weight system adapted to greatly reduce the period of swing on the unit weights when the unit weights are placed into cooperative relation with the automatic load counterbalancing mechanism. The unit weight system includes a hanger bar supported from the lever system of the weighing scale, the bar having annular grooved portions one for each of the manually applied unit weights, each of the weights having a hooked portion adapted to engage an annular groove of the hanger bar, and at least one of the interengaging portions being relieved to provide spaced apart points of contact between said portions in a plane transverse to the hanger bar.

The invention may be more readily understood from the following detailed description of a specific embodiment in which description reference is made to the accompanying drawings.

In the drawings:

Figure I is a perspective view of a unit weight cabinet of a weighing scale having an improved manipulative unit weight system, part of the cabinet being broken away.

Figure II is a front elevational view of a unit weight cabinet of a weighing scale embodying the invention, parts of the cabinet being broken away.

Figure III is a front elevational view of a dial housing, parts of the housing being broken away.

Figure IV is a perspective view of a portion of the interior of the unit weight cabinet showing the unit weights and their lifting mechanism.

Figure V is a side elevational view of the unit weight lifting mechanism.

Figure VI is an isometric view of the unit weight hanger bar engaging the hooked portion of a unit weight.

Figure VII is a front elevational view, partly in section, of the unit weight hanger bar engaging the hooked portion of a unit weight.

Figure VIII is a front elevational view, partly in section, to illustrate a second embodiment of the construction shown in Figure VII.

Figure IX is a front elevational view of the unit weight bar which is illustrated in Figure VI.

Figure X is an end elevational view of the unit weight bar which is illustrated in Figure IX.

Figure XI is a front elevational view, in reverse orientation, of the hooked portion of the unit weight which is illustrated in Figure VII.

Figure XII is a vertical sectional view taken along the line XII—XII of Figure XI.

These specific drawings and the accompanying description are intended merely to illustrate the invention but not to limit its scope.

A weighing scale embodying the invention includes a frame in the form of a cabinet 1 surmounted by a dial housing 2 erected on a housing base 3. A load receiving mechanism (not shown) is provided which includes the usual load supporting levers and load receiving platform. The load moment is transmitted to a tare beam lever 4, as best shown in Figure II, through a suitable stirrup on the nose of the load supporting levers through a rod 5, suspended by means of a stirrup 6 from laterally extending pivots 7 in the tare beam lever 4, which, by means of fulcrum pivots 8, is rockably mounted upon a fulcrum stand 9 fixedly hung from a ceiling 10 in the interior of the cabinet 1. The tare beam lever 4 carries tare beams 11 and 12, with their poises 13 and 14, bolted to projecting arms 15 which beams and cooperating poises serve to offset tare weights. The cabinet 1 is usually mounted adjacent the load receiving platform in such a position that the depending rod 5 is vertically positioned to engage the aforementioned stirrup in the nose of the load supporting lever system. Although an extension lever may be interposed between the nose end and the rod 5 the length of such extension lever is necessarily limited.

Load forces to be counterbalanced are transmitted from the tare beam lever 4 through a power pivot 16 and connecting linkage 17 to a load pivot 18 of a second lever 19, which, by means of fulcrum pivots 20, is rockably mounted upon a fulcrum bracket 21 fixedly hung from the ceiling 10 of the cabinet 1. The second lever 19 has a power pivot 22 engaging a bearing at the lower end of a steelyard rod 23 that extends upwardly into the dial housing 2 and is connected to automatic load counterbalancing mechanism enclosed within the dial housing 2. An indicator 24 cooperates with a series of indicia 25 marked on the exposed face of a chart 26 to indicate the weights of loads (Figure III).

Auxiliary load counterbalancing mechanism is also provided in the weighing scale. This comprises a plurality of individual unit weights 27 having first hooked portions 28 which may be successively and individually hooked over a hanger bar 29 secured to the lower ends of plates 30 whose upper ends are provided with V-bearings 31 which are supported upon laterally extending pivots 32 in the tare beam 4 on the opposite side of the fulcrum point of the tare beam 4 from the connection between the rod 5 and the tare beam. For counterbalancing the dead weight of the load receiving platform and the lever system, not counterbalanced by the load counterbalancing mechanism when in initial position, a hollow chamber 33, suspended by means of a rod 34 rigidly attached to the hanger bar 29, is provided for the reception of lead or other counterbalancing material. Swinging motion, or oscillation of the chamber 33 about its suspension point on the hanger bar 29, is prevented by a check link 35 whose ends pivotally engage the chamber 33 and a fulcrum stand 36 which is mounted upon the bottom of the cabinet 1.

The hanger bar 29 has a plurality of annular V-shaped grooves 37 (Figure VI) one for each of the first hooked portions 28 of the manually applied unit weights 27, the radius of curvature of the grooves being less than the radius of curvature of the knife edges 28b (Figure XII) on the hooked portions which ride on the grooves. Each of the V-shaped grooves 37 is relieved by means of flat portions 38 to reduce the period of swing on the unit weights when the unit weights are suspended from the grooves. If the grooves 37 were not relieved, the unit weights would swing back and forth for a comparatively long time and cause the scale indicator to oscillate. However, the flat portions 38 provide spaced apart points of contact between the interengaging parts of the hooked portions 28 and the V-shaped grooves 37. Each time a first hooked portion 28 rocks back and forth from one of the spaced apart points of contact to the other, such hooked portion selects a slightly different seat on the contact point, since the unit weights tend to swing back and forth in a constantly changing path slightly oblique to a line perpendicular to the longitudinal axis of the hanger bar 29. The selection of a different seat by such hooked portion 28 causes it to be directed toward one side or the other of the V-shaped groove 37 to slide down the side of the groove with a grinding action accompanied by heavy friction to greatly reduce the period of swing on the unit weight.

In a second embodiment of the invention (Figure VIII), each of the first hooked portions 28a is relieved by having a radius of curvature greater than the radius of curvature of the annular grooves 37a except that the radius of curvature 38a of the hooked portions 28a in the area of contact between the hooked portions and the annular grooves is less than the radius of curvature of the annular grooves to provide spaced apart points of contact between the interengaging portions of a plane transverse to the hanger bar 29a. The spaced apart points of contact causes the hooked portions 28a to be directed towards one side or the other of the V-shaped grooves 37a with the accompanying grinding action hereinbefore described in connection with the first embodiment of the invention (Figures VI and VII).

Unit weight lifting mechanism is provided so that the unit weights 27 may be manually applied to or taken from the hanger bar 29 by manipulation of a handle 39 located on the outside of the cabinet 1. Each time the handle 39 is turned clockwise 180 degrees the capacity of the scale is increased by a fixed amount equal to the capacity of the chart 26. Although only four unit weights 27 are provided, the weights are applied in combinations to provide nine increases to the capacity of the scale, each increase equal to the capacity of the chart 26. Each time the handle 39 is turned counterclockwise 180 degrees the capacity of the scale is decreased by a fixed amount equal to the capacity of the chart 26.

The unit weight lifting mechanism, as shown in Figures II, IV and V, is hung as a unit by means of a U-shaped bracket 40 attached to a shelf 41 within the cabinet 1. Removal of nuts 42 allows the bracket 40 carrying all of the unit weight lifting mechanism to be taken out of the cabinet 1. The unit weight lifting mechanism includes the handle 39 fixed to a shaft 43 journaled in the bracket 40 and a pinion 44 also fixed to the shaft 43 which pinion cooperates with a gear 45 fixed to a shaft 46 journaled in the bracket 40. When the handle 39 is turned and the pinion 44 drives the gear 45, lifting cams 47 and flash drive cams 48 rigidly attached to the gear 45 by means of bolts 49 threaded into the gear 45 turn in response. The cams 47 and 48 are separated from the gear 45 and from each other by separators 50, the shaft 46 to which the gear 45 is attached passing through a hole cut in each cam.

When the lifting cams 47 are turned, their cooperating follower wheels 51 drive lifting arms 52 rotatably pivoted to the shaft 43, which arms 52 have lifting pulleys 53 attached to the ends of the arms 52 remote from the follower wheels 51. The lifting pulleys 53 cooperate with second hooked portions 54 of the unit weights 27 to move the first hooked portions 28 of the unit weights from or onto the hanger bar 29. The unit weights 27 are applied in combinations to provide nine increases to the capacity of the scale, each increase equal to the capacity of the chart 26 and each increase provided by a 180 degree clockwise turn of the handle 39.

As the lifting cams 47 are turned, the flash drive cams 48 are also turned to drive a follower 55 rotatably pivoted to the shaft 43. The flash drive cams 48 are identically shaped, inversely mounted, and rigidly connected. The follower 55 includes an L-shaped bell crank 56 formed of two identically shaped spaced apart pieces pivoted side by side to the shaft 43 which bell crank 56 carries a roller 57 following one of the flash drive cams 48, and an arm 58 also formed of two identically shaped spaced apart pieces pivoted side by side to the shaft 43 which arm 58 carries a roller 59 following the other flash drive cam 48. The bell crank 56 and the arm 58 cross like the arms of scissors and are squeezed together like the arms of scissors by means of a compression spring (not shown) attached to a bolt joining the bell crank 56 and the arm 58 causing the bell crank and the arm to press the rollers 57 and 59 into constant yet flexible contact with their respective flash drive cams 48. A bar 59a is rigidly sandwiched between the two pieces forming the bell crank 56 and extends beyond the bell crank. This construction provides a fail safe positive drive for the bar 59a, i. e., no return means independent of the flash drive cams 48, such as a spring return, is used. The flash drive cams 48 are shaped and positioned to positively drive the bar 59a downward as unit weights are placed by the unit weight lifting mechanism onto the hanger bar 29 and upward as unit weights are removed from the hanger bar 29.

For the purpose of indicating the amount of load on the platform offset by the unit weights 27, when these are cooperating with the automatic load counterbalancing mechanism to counterbalance a load on the platform, the end of the bar 59a is pivotally connected to a flash drive rod 59b extending upwardly within the cabinet 1 which flash drive rod is coupled with a rod 60 smaller in diameter extending into the dial housing 2 (Figure III). The rod 60 is pivotally connected to an arm 61 pivoted at 62 in the dial housing 2. The opposite end of the arm 61 is provided with a plate 63 bearing a series of numerals which represent weight values offset by the unit weights 27. The plate 63 is positioned immediately in back of the chart 26 so that one of the series of numerals thereon is visible in an opening 64 in this chart. Appropriate lettering adjacent the opening 64, e. g. ADD-Lbs., serves to call the attention of the operator to the fact that the amount represented by the figures appearing in this opening must be added to the amount indicated by the indicator 24 on the chart 26.

The embodiments of the invention that have been disclosed may be modified to meet various requirements.

Having described the invention, we claim:

1. In a weighing scale having an automatic load counterbalancing system and manually applied weights for increasing the load offsetting capacity, in combination, a hanger bar supported from the lever system of the scale, the hanger bar having annular grooved portions about the longitudinal axis of the bar, there being one grooved portion for each of the manually applied weights, and a hooked portion on each of the weights adapted to engage an annular groove of the hanger bar, at least one of the interengaging portions being relieved to provide spaced apart points of contact between the portions in a plane transverse to the hanger bar, whereby, should the weights swing after they are hung on the bar, slightly different seats will be selected on said contact points on each swing so that the hooked portions will be directed toward one side or the other of the grooved portions to slide down the sides of the grooved portions with a grinding action accompanied by heavy friction to reduce the period of swing on the weights.

2. In a weighing scale having an automatic load counterbalancing system and manually applied weights for increasing the load offsetting capacity, in combination, a hanger bar supported from the lever system of the scale, the hanger bar having annular grooved portions one for each of the manually applied weights, and a curved portion on each of the weights adapted to contact an annular groove of the hanger bar, the radius of curvature of the curved portion being greater than the radius of curvature of the annular groove except that the radius of curvature of the curved portion in the area of contact between the curved portion and the annular groove is less than the radius of curvature of the annular groove to provide spaced apart points of contact, whereby, should the weights swing after they are hung on the bar, slightly different seats will be selected on said contact points on each swing so that the curved portions will be directed toward one side or the other of the grooved portions to slide down the sides of the grooved portions with a grinding action accompanied by heavy friction to reduce the period of swing on the weights.

3. In a weighing scale having an automatic load counterbalancing system and manually applied weights for increasing the load offsetting capacity, in combination, a hanger bar supported from the lever system of the scale, the hanger bar having annular grooved portions about the longitudinal axis of the bar, there being one grooved portion for each of the manually applied weights, and a hooked portion on each of the weights adapted to engage an annular groove of the hanger bar, the interengaging portion of the hooked portion being relieved to provide spaced apart points of contact between interengaging portions, whereby, should the weights swing after they are hung on the bar, slightly different seats will be selected on said contact points on each swing so that the hooked portions will be directed toward one side or the other of the grooved portions to slide down the sides of the grooved portions with a grinding action accompanied by heavy friction to reduce the period of swing on the weights.

4. In a weighing scale having an automatic load counterbalancing system and manually applied weights for increasing the load offsetting capacity, in combination, a hanger bar supported from the lever system of the scale, the hanger bar having annular V-shaped grooves about the longitudinal axis of the bar, there being one groove for each of the manually applied weights, and a hooked portion on each of the weights adapted to engaged an annular groove of the hanger bar, the interengaging portion of each of the annular grooves being relieved to provide spaced apart points of contact between interengaging portions, whereby, should the weights swing after they are hung on the bar, slightly different seats will be selected on said contact points on each swing so that the hooked portions will be directed toward one side or the other of the grooves to slide down the sides of the grooves with a grinding action accompanied by heavy friction to reduce the period of swing on the weights.

5. In a weighing scale having an automatic load counterbalancing system, unit weights for increasing the load offsetting capacity and unit weight lifting mechanism, means supported from the lever system of the scale for carrying the unit weights including a hanger bar having a plurality of V-shaped grooves about the longitudinal axis of the bar, there being one groove for each of the unit weights, which weights are suspended from the grooves, each groove having a flat portion to provide spaced apart points of contact between the weights and the grooves, whereby, should the weights swing after they are hung from the bar, slightly different seats will be selected on said contact points on each swing so that the weights will be directed toward one side or the other of the grooves to slide down the sides of the grooves with a grinding action accompanied by heavy friction to reduce the period of swing on the weights.

References Cited in the file of this patent

UNITED STATES PATENTS

| | | |
|---|---|---|
| 1,499,782 | Pool | July 1, 1924 |
| 1,661,556 | Bryce | Mar. 6, 1928 |
| 1,667,894 | Hem | May 1, 1928 |
| 2,392,023 | Cooper | Jan. 1, 1946 |
| 2,647,741 | Wasko | Aug. 4, 1953 |